(12) United States Patent
Becker

(10) Patent No.: US 6,459,707 B1
(45) Date of Patent: Oct. 1, 2002

(54) RELAY MULTIPLEXER SYSTEM AND METHOD FOR PREVENTION OF SHOCK HAZARD

(75) Inventor: Alvin G. Becker, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/219,205

(22) Filed: Dec. 22, 1998

(51) Int. Cl.[7] ............................. H01H 7/20; H01H 47/22
(52) U.S. Cl. ........................... 370/537; 370/531; 361/1; 361/93.1; 361/102; 361/160; 361/167; 361/170 361/191; 361/192
(58) Field of Search ................................ 370/498, 531, 370/537; 361/1, 93.1, 102, 139, 160, 167, 170, 191, 192

(56) References Cited

U.S. PATENT DOCUMENTS

| | | | | |
|---|---|---|---|---|
| 3,946,961 A | * | 3/1976 | Bahnsen ................ 242/67.1 R |
| 4,103,520 A | * | 8/1978 | Jarvis et al. ................ 68/12 R |
| 4,106,072 A | * | 8/1978 | MacLean .................... 361/156 |
| 4,133,020 A | * | 1/1979 | MacLean .................... 361/156 |
| 4,333,122 A | * | 6/1982 | Hayden et al. ............. 361/114 |
| 4,360,766 A | * | 11/1982 | Bogardus, Jr. ............. 318/139 |
| 4,368,394 A | * | 1/1983 | Naimer ....................... 307/115 |
| 4,652,769 A | * | 3/1987 | Smith et al. ................. 307/31 |
| 4,796,152 A | * | 1/1989 | Sinden et al. .............. 361/192 |
| 4,931,721 A | * | 6/1990 | Berrigan et al. ........... 324/658 |
| 5,000,692 A | * | 3/1991 | Taniguchi et al. .......... 439/160 |
| 5,212,907 A | * | 5/1993 | Van Sandt ..................... 49/70 |
| 5,291,106 A | * | 3/1994 | Murty et al. ................ 318/375 |
| 5,291,373 A | * | 3/1994 | Monacelli et al. .......... 361/760 |
| 5,297,335 A | * | 3/1994 | Vancil .......................... 29/868 |
| 5,631,504 A | * | 5/1997 | Adahan ........................ 307/72 |
| 5,638,261 A | * | 6/1997 | Adams ......................... 363/20 |
| 5,751,536 A | * | 5/1998 | Haddad et al. ............. 361/191 |
| 5,806,377 A | * | 9/1998 | Noda et al. ................... 74/552 |
| 5,917,362 A | * | 6/1999 | Kohama ...................... 327/408 |
| 5,952,741 A | * | 9/1999 | Toy ............................. 307/326 |
| 5,999,394 A | * | 12/1999 | Dias ............................ 361/119 |
| 6,259,173 B1 | * | 7/2001 | Dias et al. ................... 307/147 |

OTHER PUBLICATIONS

A. Takita, S. Takahashi, M. Fukai, and T. Takei. Recent Technical Developments in Thermal Power Station Supervisory and Control Systems. Hitachi Review vol. 48 (1999), No. 5. pp. 267–272.*

Nike I Systems: TTR Transmitter and Receiver Circuitry (U). Department of the Army Technical Manual. (http//ed–thelen.org/tm9–5000–18.html). May 1956, pp. 1–33 and Figs. 1–10.*

* cited by examiner

Primary Examiner—Hassan Kizou
Assistant Examiner—Joe Logsdon
(74) Attorney, Agent, or Firm—Conley, Rose & Tayon PC; Jeffrey C. Hood

(57) ABSTRACT

A relay multiplexing system which provides improved safety from hazardous voltage conditions. The relay multiplexing system comprises a relay multiplexer module and a terminal block which connects to the relay multiplexer module. The relay multiplexer module and corresponding terminal block incorporate a design according to the present invention whereby power can only be provided to the respective relays when the corresponding terminal block is connected to the respective relay multiplexer module. The terminal block is required to form an electrical path between the power supply in the relay multiplexer module and the relays. Thus, when the terminal block is removed from the corresponding relay multiplexer module, power is unable to be provided to the relays, thereby ensuring safety from hazardous voltages which could otherwise appear on exposed pins of the connector.

20 Claims, 3 Drawing Sheets

RELAY MULTIPLEXER SYSTEM AND METHOD FOR PREVENTION OF SHOCK HAZARD

BACKGROUND OF THE INVENTION

1. Field of the Invention

The present invention relates to relay multiplexers for multiplexing input or output signals, such as in instrumentation/data acquisition (DAQ) systems, and more particularly to an improved relay multiplexer system which provides improved safety from shock hazards.

2. Description of the Related Art

Scientists and engineers often use instrumentation or DAQ systems to perform a variety of functions, including test and measurement, laboratory research, process monitoring and control, data logging, analytical chemistry, test and analysis of physical phenomena, and control of mechanical or electrical machinery, to name a few examples.

A typical computer-based instrumentation system comprises a computer system with instrumentation hardware, one or more transducers, and signal conditioning logic coupled between the transducers and the instrumentation hardware. The transducers or other detecting means convert the physical phenomena being measured into electrical signals, such as voltage or current, measurable by the instrumentation hardware. Examples of transducers include thermocouples (temperature to voltage), RTDs (temperature to electrical resistance), strain gauges (strain to voltage), and microphones (sound to voltage).

In a computer-based system, the instrumentation hardware or device is typically an expansion card plugged into one of the I/O slots of the computer system. In another common instrumentation system configuration, the instrumentation hardware is coupled to the computer system via other means such as through a VXI (VME eXtensions for Instrumentation) bus, a GPIB (General Purpose Interface Bus), a serial port or bus, or parallel port of the computer system. The instrumentation hardware may be a data acquisition (DAQ) card, a multimeter card, or other type of instrumentation device.

The instrumentation device enables the computerized measurement and generation of real world analog and digital signals. The instrumentation device, e.g., a DAQ device, a multimeter device, etc., typically includes one or more analog to digital (A/D) converters (ADCs), digital to analog (D/A) converters (DACs), digital I/O ports, and counter/timer circuits.

The instrumentation hardware is configured and controlled by software executing on the computer system. The software for configuring and controlling the instrumentation system typically comprises driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function which the user intends the instrumentation system to perform. The instrumentation hardware manufacturer or third party software vendor sometimes supplies application software for applications which are common, generic or straightforward.

The signal conditioning logic may include relay multiplexers which multiplex a plurality of signals into the instrumentation device. A relay multiplexing module is used when the device(s) under test (DUT) present a plurality of signals to the instrumentation device. The relay multiplexing module comprises a set of switches that bring one signal at a time to the input of the instrumentation device to be measured. The relay multiplexer module time multiplexes a plurality of channels to 1 channel by sequentially closing one or more relays at a time.

When a large number of input signals are desired to be provided to the instrumentation device, then typically two or more relay multiplexer modules are used to multiplex the input signals. In this instance, an analog bus is used to interconnect the signals from the multiplexer modules. The analog bus allows the user to daisy chain the multiplexer modules or place them in parallel to provide a signal count much higher than 1 relay multiplexer or switch can provide. For example, the SCXI standard includes an analog bus for this purpose.

Instrumentation systems are often used to measure high voltage signals. In this instance the high voltage signals are provided through the relay multiplexers. When one or more conventional relay multiplexers are used in the measurement of high voltage signals, this may inadvertently expose an operator to these hazardous voltages.

For example, some relay multiplexers, such as for VXI, include two or more connectors which potentially can route high voltage signals from one connector back onto the connector pins of an un-used connector, where they are exposed to the user. Also, problems can arise when two or more relay multiplexers are used to multiplex the input signals to an analog bus. In this instance one relay may be closed, presenting a high voltage on the analog bus. This may, for example, cause a high voltage to be received by another relay module and provided back out another channel to the user. If a connector is plugged into the second relay multiplexer module, there is no safety hazard to the user because the pins are enclosed by the connector. However, if the connector is removed or off during this instance, thereby exposing the connector pins, then one of the signal pins may present a very high voltage, hence presenting a safety hazard.

Therefore, an improved relay multiplexer system is desired which provides improved safety during the measurement of high voltage signals.

SUMMARY OF THE INVENTION

The present invention comprises a relay multiplexing system which provides improved safety from hazardous voltage conditions. The relay multiplexing system comprises a relay multiplexer module and a terminal block which connects to the relay multiplexer module. The relay multiplexer module and corresponding terminal block incorporate a design according to the present invention whereby power can only be provided to the respective relays when the corresponding terminal block is connected to the respective relay multiplexer module. When the terminal block is removed from the corresponding relay multiplexer module, power is unable to be provided to the relays, thereby ensuring safety from hazardous voltages.

The relay multiplexer module includes a power supply, a plurality of relays, and a front connector. The plurality of relays each include a power input which is adapted to be coupled to the power supply to control operation of the relays. The front connector includes a first pin connected to the power supply and a second pin which is connected to the power input of each of the plurality of relays. The terminal block is adapted to connect to the front connector of the relay multiplexer module, wherein the terminal block electrically connects the first and second pins of the front connector when the terminal block is connected to the relay multiplexer module. Thus, when the terminal block is connected to the relay multiplexer module, an electrical path is created from the power supply, through the terminal bock, and then back to the relays, thereby selectively enabling operation of the relays. When the terminal block is removed from the relay multiplexer module, the electrical path is disconnected, thereby disabling operation of the relays.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Instrumentation System

Figure 1:
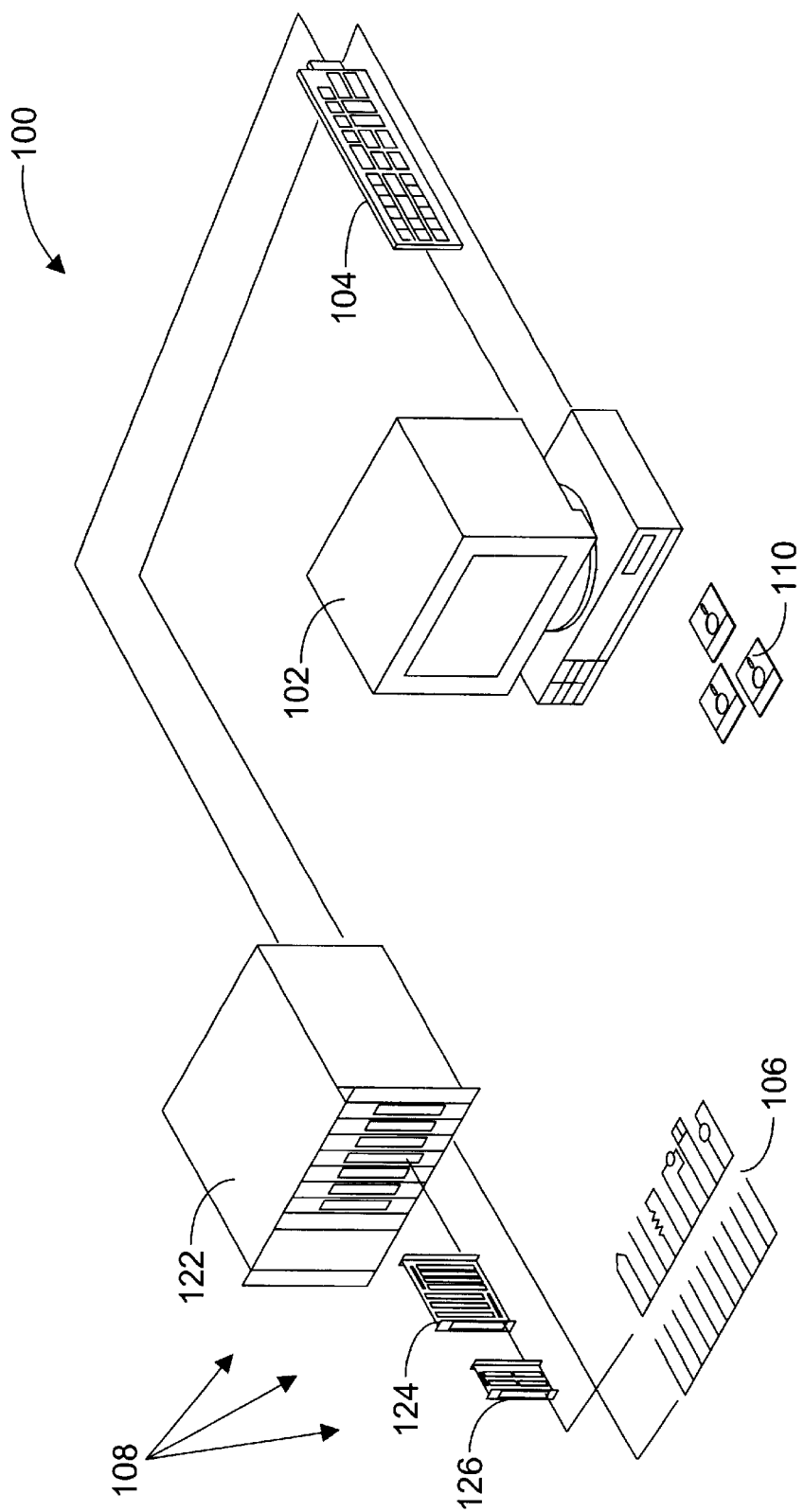
FIG. 1 illustrates an instrumentation system according to the present invention.

Referring now to FIG. 1, an illustrative computer-based instrumentation system 100 according to the present invention is shown. The relay multiplexer system of the present invention is preferably comprised in the computer-based instrumentation system 100. However, the present invention may also be comprised in a standard handheld or benchtop instrument, such as a standard multimeter, or in any of various other systems which use relay multiplexers.

The instrumentation system 100 comprises a computer 102 having an operating system and other software, an instrumentation device or board 104 coupled to the computer 102, and transducers 106 or other detecting means which provide field electrical signals to/from the instrumentation device 104 through signal conditioning logic 108.

The computer 102 includes various standard components, including at least one central processing unit (CPU), memory, a hard drive, one or more buses, and a power supply. The computer also stores software programs, represented by media 110. In one embodiment, the computer 102 comprises input/output (I/O) slots into which the instrumentation device 104 is coupled. In the embodiment of FIG. 1, the instrumentation device 104 is a board or card adapted for insertion into an expansion slot of the computer system 102. The board 104 is shown external to the computer system 102 in FIG. 1 for illustrative purposes. In another embodiment, the instrumentation device 104 is coupled to the computer 102 by a VMV (VME Extensions for Instrumentation) chassis and bus, a GPIB (General Purpose Interface Bus), a serial bus or port or a parallel port. The instrumentation device 104 may be any of various types, such as a data acquisition (DAQ) device or card, a multimeter card, a voltmeter card, etc.

The transducers 106 are conditioned by the signal conditioning circuitry 108 for presentation to the DAQ device 20 as shown. In the embodiment of FIG. 1, the signal conditioning circuitry 108 comprises an SCXI (Signal Conditioning Extensions for Instrumentation) chassis 122, one or more SCM modules 124, and one or more SCXI terminal blocks 126. SCM is an open architecture, multi-channel signal conditioning front-end system for instrumentation devices. SCM comprises an external chassis housing signal conditioning modules for amplifying, multiplexing, and isolating field signals. The signal conditioning modules advantageously reduce the introduction of noise into the signals transmitted to the DAQ device 104.

The signal conditioning circuitry 108 may include one or more relay multiplexer modules 124 and optionally one or more signal conditioning cards or modules. The signal conditioning circuitry 108 also includes one or more connectors or terminal blocks 126. The relay multiplexer module 124 and the terminal block 126 collectively implement the improved safety features of the present invention.

The transducers 106 and other detecting means provide the field signals representing a process, physical phenomena, equipment being monitored or measured, etc. to/from the instrumentation device 104. Examples of the transducers 106 are strain gauges, thermocouples, thermistors, photo-conductive cells, microphones, and piezoelectric transducers, among others.

Figure 2:
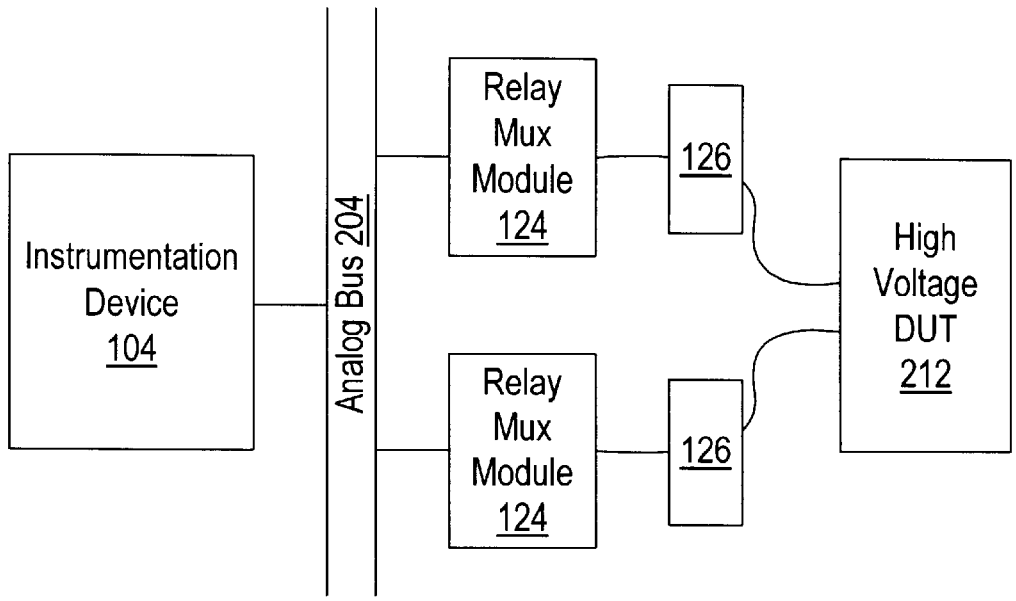
FIGS. 2 and 3 are block diagrams of portions of the instrumentation system of FIG. 1.
Figure 3:
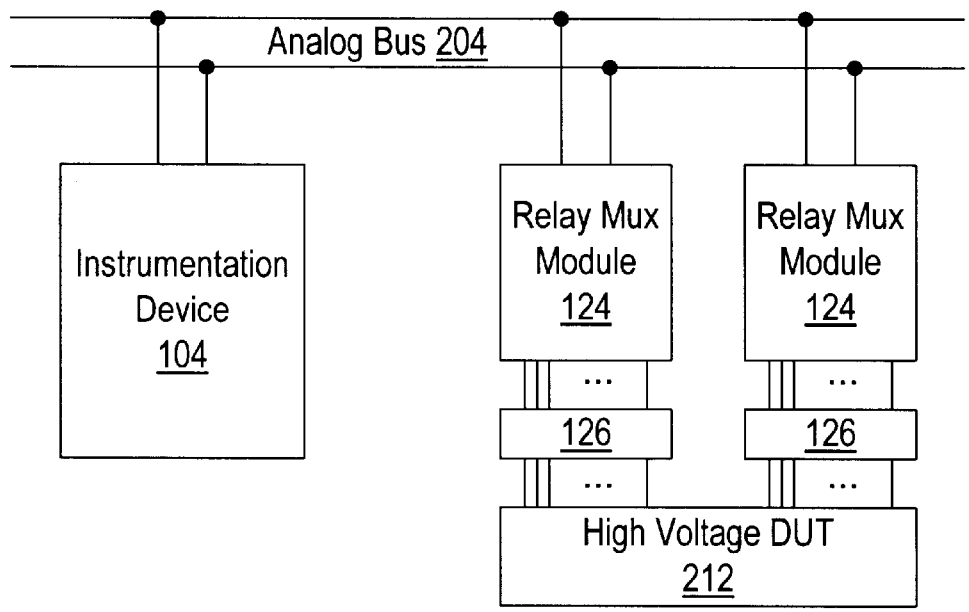

FIGS. 2 and 3—Block Diagrams

FIGS. 2 and 3 are block diagrams of portions of the instrumentation system 100 of FIG. 1. FIG. 3 illustrates the block diagram of FIG. 2 from the perspective of the analog bus 204.

As shown in FIG. 2, a device under test (DUT) 212 is coupled to the instrumentation system. The DUT may provide high voltage signals. The DUT 212 provides signals to one or more connectors or terminal blocks 126, which are in turn connected to one or more relay multiplexer modules 124. In the present disclosure, the term "terminal block" is intended to include any of various types of terminal blocks or connectors.

In the block diagram of FIG. 2, two relay multiplexer modules 124 and two corresponding terminal blocks 126 are included in the instrumentation system 100. In this system, the relay multiplexer modules 124 are connected via analog bus 204. In the preferred embodiment where SCXI hardware is used, the analog bus 204 is comprised within the SCXI chassis 122. The instrumentation device 104 connects to the analog bus 204 as shown. The present invention also operates in systems including only a single relay multiplexer module 124 and a single terminal block 126.

As discussed in the background section, due to improper programming and/or erroneous operation, it is possible that two relays may be improperly closed at the same time, thus possibly exposing the user to high voltages. In this instance when two or more relays are improperly closed at the same time, a high voltage may be received on one input channel and provided back out on another channel to the user. If a terminal block 126 is plugged into the respective relay multiplexer module 124, then there is no safety hazard to the user, since the pins which may be carrying the high voltage are not exposed to the user. However, if the terminal block 126 is off or removed when two or more relays are improperly closed and this high voltage condition occurs, the connector pins are exposed, and one or more signal pins may present a very high voltage to the user, thereby presenting a safety hazard.

According to the present invention, each relay multiplexer module 124 and corresponding terminal block 126 incorporates a design according to the present invention whereby power can only be provided to the respective relays when the corresponding terminal block 126 is connected to the respective relay multiplexer module 124. When the terminal block 126 is removed from the corresponding relay multiplexer module 124, the electrical path between the power supply and the relays is removed, thereby creating an open circuit and ensuring that the relays cannot receive power. An open circuit is ensured in this instance even in the case of software error.

It is noted that the present invention operates in the case when only a single relay multiplexer module 124 and a single connector 126 are used, and also in cases when two or more relay multiplexer modules 124 and two or more corresponding connectors 126 are used.

Figure 4:
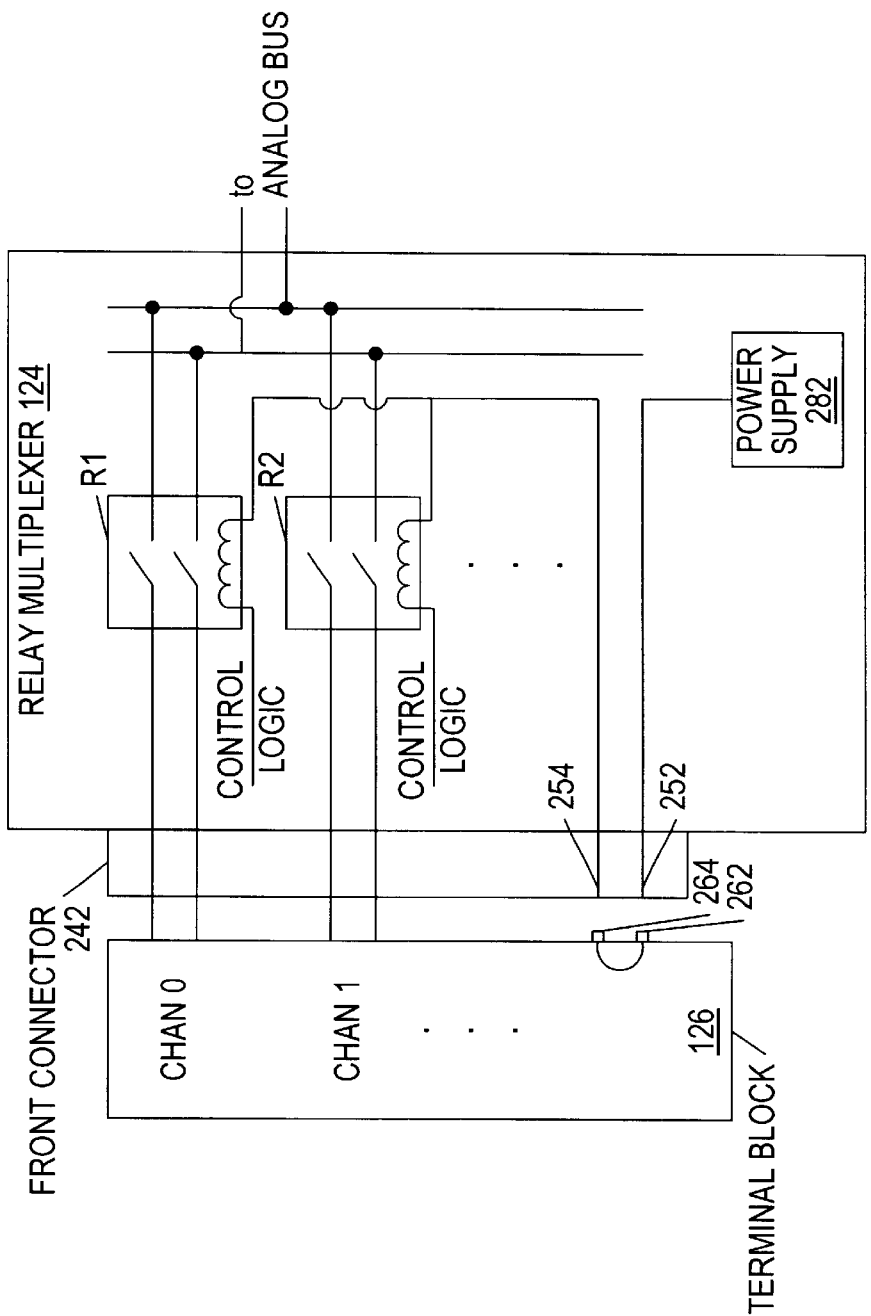
FIG. 4 illustrates the relay multiplexers and terminal blocks including the improved safety features of the present invention.

FIG. 4—Relay Multiplexer and Terminal Block

FIG. 4 is a more detailed diagram illustrating the relay multiplexer module 124 and corresponding terminal block 126 according to the present invention. As shown, the relay multiplexer module 124 also includes a front connector 242 which is adapted to connect to the terminal blocks or connectors 126. The relay multiplexer module 124 also includes a power supply 282 and a plurality of relays R1 and R2. The relay multiplexer module 124 will generally include a large plurality of relays, and only two relays R1 and R2 are show for convenience.

The relays R1 and R2 include coils which are essentially electromagnets. When a voltage is applied from the power supply 282 to the electromagnet or relay, the voltage pulls the contacts of the relay or switch closed. Thus, if no voltage is applied to the relay, the relay is unable to close and hence remains open.

The present invention operates to ensure that all relays are open when a terminal block 126 is absent or not connected to the corresponding relay multiplexer module 124. More specifically, the preferred embodiment of the present invention provides a design and method which prevents voltage from reaching the coils of the relays when no terminal block 126 is present or connected. In this case, hazardous high voltage that may be present on the analog bus is prevented from appearing on the exposed terminals of the connector where they would be exposed to the user.

In prior art relay multiplexers, each of the coils comprising the relays have a side connected directly to a power supply, wherein the power supply provides a voltage to open and close the contacts of the relay. In these prior art relay multiplexers, no provision is made to protect the user from high voltages on exposed connector pins. Other prior art uses connectors with insulating shrouds around every pin, such that pins cannot be exposed. This results in much larger connectors, or fewer pins in the same space.

In the preferred embodiment of the invention, as shown in FIG. 4, the power supply 282 which would normally be directly connected to the relays is instead connected out to a first pin 252 on the relay multiplexer front connector 242. This first pin 252 brings the power supply signal out the front connector 242 to a corresponding connection 262 on the terminal block 126. This connection 262 on the terminal block 126 is electrically connected to a second connection 264 on the terminal block 126. This second connection 264 of terminal block 126 connects to a corresponding second pin 254 of the front connector 242 of the relay multiplexer module 124 when the terminal block 126 is connected to the relay multiplexer module 124. The second pin 254 of the front connector 242 of the relay multiplexer module 124 is connected to the power input of the relays R1 and R2. Thus the respective side of the coil which would normally be connected to the power supply 282 is instead connected out to the second pin 254 on the relay multiplexer front connector 242.

This operates to create an electrical path or circuit for the power supply signal from the power supply 282, out the front connector 242, to the first pin 252, through the first connection 262 of the terminal block 126, back through the second connection 264 of the terminal block 126, through the second pin 254 on the relay multiplexer module 124, and then back to power the respective relays R1 and R2. Thus, power can only be provided to the relays R1 and R2 when the terminal block 126 is plugged or connected into the respective relay multiplexer module 124. When the terminal block 126 is unplugged or disconnected from the relay multiplexer module 124, this operates to break the electrical connection or circuit between the power supply 282 and the relays R1 and R2, thus preventing any power from reaching the relays R1 and R2 and thus preventing the relays R1 and R2 from being closed. This operates to provide improved safety conditions for the user, whereby power can only be provided to the relays R1 and R2 when the terminal block 126 is connected to the relay multiplexer module 124 and hence the pins of the connector are covered by the terminal block and thus are not exposed to the user. If the terminal block 126 is unconnected or removed, no power can be provided to the relays and thus the user is safe from hazardous voltage conditions that would result from high voltages from the analog bus appearing on the exposed pins of the connector.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A relay multiplexing system which provides improved safety from hazardous voltage conditions, comprising:
    a relay multiplexer module, comprising:
        a power supply;
        a plurality of relays each including a power input which is adapted to be coupled to the power supply to control operation of the relays;
        a front connector including a first pin connected to the power supply and a second pin which is connected to the power input of each of the plurality of relays; and
    a terminal block adapted to connect to the front connector of the relay multiplexer module, wherein the terminal block is operable to electrically connect the first and second pins of the front connector when the terminal block is connected to the relay multiplexer module.

2. The relay multiplexing system of claim 1, wherein the terminal block enables power to be provided from the power supply through the terminal block and then to the power input of each of the plurality of relays, thereby selectively enabling operation of the relays.

3. The relay multiplexing system of claim 1, wherein the terminal block completes an electrical path from the power supply through the terminal block and then to the power input of each of the plurality of relays, thereby selectively enabling operation of the relays.

4. The relay multiplexing system of claim 3, wherein the terminal block includes a first connection and a second connection, wherein the first connection is adapted to electrically connect to the first pin of the relay multiplexer module and the second connection is adapted to electrically connect to the second pin of the relay multiplexer module when the terminal block is connected to the relay multiplexer module, wherein the first connection and the second connection of the terminal block are electrically connected, wherein when the terminal block is connected to the relay multiplexer module the electrical connections operate to provide power from the power supply through the terminal block and then to the power input of each of the plurality of relays, thereby selectively enabling operation of the relays;

wherein when the terminal block is not connected to the relay multiplexer module, power is unable to be provided from the power supply to the power input of each of the plurality of relays.

5. The relay multiplexing system of claim 1, wherein when the terminal block is not connected to the relay multiplexer module, power is unable to be provided from the power supply to the power input of each of the plurality of relays.

6. The relay multiplexing system of claim 1, wherein each of the plurality of relays includes an electromagnet which controls contacts of the relays, wherein the electromagnet includes the power input which is adapted to be coupled to the power supply to control operation of the relays.

7. The relay multiplexing system of claim 1, wherein the relay multiplexing system prevents high voltage signals from appearing on exposed pins of the front connector, thereby preventing exposure to a user of the high voltage signals.

8. A relay multiplexing module which provides improved safety from hazardous voltage conditions, comprising:
    a power supply;
    a plurality of relays each including a power input which is adapted to be coupled to the power supply to control operation of the relays; and
    a front connector including a first pin connected to the power supply and a second pin which is connected to the power input of each of the plurality of relays;
    wherein the front connector is adapted to couple to a terminal block, wherein the terminal block is operable to electrically connect the first and second pins of the front connector when the terminal block is connected to the relay multiplexer module.

9. The relay multiplexing module of claim 8, wherein power is provided from the power supply to the power input of each of the plurality of relays when the terminal block is connected to the front connector, thereby selectively enabling operation of the relays.

10. The relay multiplexing module of claim 8, wherein power is unable to be provided from the power supply to the power input of each of the plurality of relays when the terminal block is not connected to the relay multiplexer module.

11. The relay multiplexing module of claim 8, wherein high voltage signals are prevented from appearing on exposed pins of the front connector, thereby preventing exposure to a user of the high voltage signals.

12. A relay multiplexing system which provides improved safety from hazardous voltage conditions, comprising:
    a relay multiplexer module, comprising:
        a power supply;
        a plurality of relays each including a power input which is adapted to be coupled to the power supply to control operation of the relays;
        a front connector including a first pin connected to the power supply and a second pin which is connected to the power input of each of the plurality of relays; and
    a terminal block adapted to connect to the front connector of the relay multiplexer module, wherein the terminal block includes a first connection and a second connection, wherein the first connection is adapted to electrically connect to the first pin of the relay multiplexer module and the second connection is adapted to electrically connect to the second pin of the relay multiplexer module when the terminal block is connected to the relay multiplexer module, wherein the first connection and the second connection of the terminal block are electrically connected, wherein when the terminal block is connected to the relay multiplexer module the electrical connections operate to provide power from the power supply through the terminal block and then to the power input of each of the plurality of relays, thereby selectively enabling operation of the relays;

wherein when the terminal block is not connected to the relay multiplexer module, power is unable to be provided from the power supply to the power input of each of the plurality of relays.

13. The relay multiplexing system of claim 12, wherein the relay multiplexing system prevents high voltage signals from appearing on exposed pins of the front connector, thereby preventing exposure to a user of the high voltage signals.

14. A method which provides improved safety from hazardous voltage conditions in a relay multiplexing system, comprising:
    connecting a terminal block to a front connector of a relay multiplexer module, wherein the relay multiplexer module includes a power supply and a plurality of relays, wherein the front connector includes a first pin coupled to the power supply and a second pin coupled to a power input of each of the plurality of relays;
    providing power from the first pin through the terminal block and then back to the second pin in response to said connecting, thereby selectively enabling operation of the relays.

15. The method of claim 14, further comprising:
    disconnecting the terminal block from the relay multiplexer module, wherein said disconnecting disables power from being provided from the power supply to the power input of each of the plurality of relays, thereby disabling operation of the relays.

16. The method of claim 14,
    wherein the terminal block includes a first connection and a second connection which are electrically connected;
    wherein said connecting includes the first connection electrically connecting to the first pin of the relay multiplexer module and the second connection electrically connecting to the second pin of the relay multiplexer module;
    wherein said providing power comprises providing power from the power supply through the first pin, the first connection, the second connection, the second pin, and then to the power input of each of the plurality of relays.

17. The method of claim 16, wherein the method prevents high voltage signals from appearing on exposed pins of the front connector, thereby preventing exposure to a user of the high voltage signals.

18. A method which provides improved safety from hazardous voltage conditions in a relay multiplexing system, comprising:
    connecting a terminal block to a front connector of a relay multiplexer module, wherein the relay multiplexer module includes a power supply and a plurality of relays, wherein the front connector includes a first pin coupled to the power supply and a second pin coupled to a power input of each of the plurality of relays;

providing an electrical path from the first pin through the terminal block and then back to the second pin in response to said connecting, thereby selectively enabling operation of the relays.

19. The method of claim 18, further comprising:

disconnecting the termiinal block from the relay multiplexer module, wherein said disconnecting disconnects the electrical path from the power supply to the power input of each of the plurality of relays, thereby disabling operation of the relays.

20. The method of claim 18, wherein the method prevents high voltage signals from appearing on exposed pins of the relay multiplexer module, thereby preventing exposure to a user of the high voltage signals.

* * * * *